United States Patent [19]

Narumi et al.

[11] Patent Number: 5,375,046
[45] Date of Patent: Dec. 20, 1994

[54] APPARATUS OF HOLDING COVER OF LAMP ASSEMBLY OF VEHICLE

[75] Inventors: Yoshitaka Narumi, Kasukabe; Ryoji Ito, Ichikawa, both of Japan

[73] Assignee: Stanley Electric Co., Ltd., Tokyo, Japan

[21] Appl. No.: 101,930

[22] Filed: Aug. 4, 1993

[30] Foreign Application Priority Data

Aug. 12, 1992 [JP] Japan ............................ 4-061978[U]

[51] Int. Cl.⁵ .............................................. H01R 33/00
[52] U.S. Cl. .................................... 362/226; 362/61;
439/548; 439/559; 313/318
[58] Field of Search ............... 362/61, 226, 267, 310,
362/433; 313/318; 439/559, 560, 561, 562, 546,
547, 548, 549

[56] References Cited

U.S. PATENT DOCUMENTS

| 4,029,953 | 6/1977 | Natoli | 439/546 X |
| 4,635,174 | 1/1987 | Montet | |
| 4,764,854 | 8/1988 | Matsune et al. | 362/226 |
| 4,819,133 | 4/1989 | Kochi et al. | 362/226 X |
| 4,841,419 | 6/1989 | Ohishi | 313/318 X |

FOREIGN PATENT DOCUMENTS 0300482 4/1989 European Pat. Off. .
3523080A1 1/1986 Germany .

Primary Examiner—Ira S. Lazarus
Assistant Examiner—Thomas M. Sember
Attorney, Agent, or Firm—Frishauf, Holtz, Goodman & Woodward

[57] ABSTRACT

An apparatus for holding a rubber or elastic cover covering a bulb exchange opening of a lamp assembly of a vehicle, comprises a holder defining the bulb exchange opening and having a plurality of outer engagement claws formed at predetermined intervals in the circumferential direction of the holder, and a cap retaining the cover together with the holder. The cap has a plurality of hooks engaging the claws when the cap is rotated for engaging the holder. At least one cap abutment is provided on the holder at a circumferential position of the holder between adjacent two claws, which provides interference in the direction of engagement between the cap and the cap abutment when the cap is mounted on the holder, so that a sensible physical response is given to an operator for confirming the correct right engagement of the cover, the cap and the holder, to reliably enhance the holding function.

6 Claims, 2 Drawing Sheets

APPARATUS OF HOLDING COVER OF LAMP ASSEMBLY OF VEHICLE

BACKGROUND OF THE INVENTION

1. Field of the Invention

This invention relates to an apparatus for holding a cover of a lamp assembly of a vehicle, and more particularly to an apparatus for holding a rubber or elastic cover which is removably mounted on a holder of a lamp assembly of a vehicle and covers a bulb exchange opening from rain or water.

2. Background Art

FIG. 3 shows a prior-art apparatus for holding a rubber cover 80 on a hollow cylindrical holder 91 of a lamp assembly 90 of a vehicle. The holder 91 defines a bulb exchange opening and has outer engagement claws 91a formed at its plural (e.g. three) circumferential positions. The lamp assembly 90 comprises a separate cap 92 having hooks 92a engageable with the outer engagement claws 91a. In mounting, an outwardly extending flange 80a of the cover 80 is in contact with the top edge surface of the holder 91, the cap 92 is then placed over the holder 91 to sandwich the flange 80a of the cover 80 with the top edge surface of the holder 91, and the cap 92 is then rotated for engaging the hooks 92a with the outer engagement claws 91a of the holder 91.

Each of the hooks 92a has a tapered portion 92b and a concavely stepped portion 92c so that the cap 92 forcibly presses the flange 80a between the cap 92 and the holder 91 as an operator rotates the cap 92. Thereby the apparatus secures a tight seal of the interior of the lamp assembly against rain or water. Further, when the outer engagement claws 91a reach the concavely stepped portions 92c, fingers of the operator feel a physical response by which he or she realizes that the cap 92 has been set in place. The concavely stepped portions 92c also prevent the cap 92 from rotating in the reverse direction in service of the lamp assembly 90 to increase reliability of the function of the cap 92 of retaining the cover 80 on the holder 91.

In the prior-art apparatus, the retention of the cap 92 on the holder 91 and the physical response of the operator are attributed to elasticity of the flange 80a of the rubber cover 80. Therefore, if the cover 80 loses elasticity due to aging, then the operator feels no physical response in mounting the cover 80 on the holder 91, and the cap 92 cannot securely retain the cover 80 on the holder 91. Thus, reliability of the holder 91 and the cap 92 in retaining the cover 80 in a rain-tight manner decreases. The solution of such problem therefore has been desired.

SUMMARY OF THE INVENTION

An object of the present invention is to provide an improved apparatus for holding an elastic or rubber cover which is mounted on a holder of a lamp assembly of vehicle, for holding a bulb opening rain-tight.

The present invention comprises a hollow cylindrical holder defining a bulb exchange opening and having a plurality of outer engagement claws formed at predetermined intervals in the circumferential direction, and a cap removably mounted on the holder for retaining the cover together with the holder. The cap has a plurality of hooks engaging the outer engagement claws when the cap is rotated to the right position. The apparatus further comprises at least one cap abutment in contact with the cap at a position between an adjacent two of the outer engagement claws so that the cap and the cap abutment interfere when the cap is mounted on the holder.

As described above, the apparatus has the cap abutment for biasing the cap in the direction of engagement between the outer engagement claws and the hooks, so that a predetermined amount of partial deformation of the cap is produced when the outer engagement claws engage the hooks. Therefore, the apparatus can produce a sensible physical response to an operator while maintaining the holding function, even when elasticity of the rubber cover decreases due to aging. Within this structure, the present invention solves the above problems and successfully enhances reliability of the apparatus.

Other objects, features and advantages of the present invention will be apparent from a consideration of the following description, taken in connection with the accompanying drawing.

BRIEF DESCRIPTION OF THE DRAWINGS

FIG. 3 is a sectional view of a prior-art apparatus for holding a cover of a lamp assembly of vehicle a.

DETAILED DESCRIPTION OF THE PREFERRED EMBODIMENTS

A preferred embodiment of the present invention will be described with reference to the drawings hereinafter.

Figure 1:
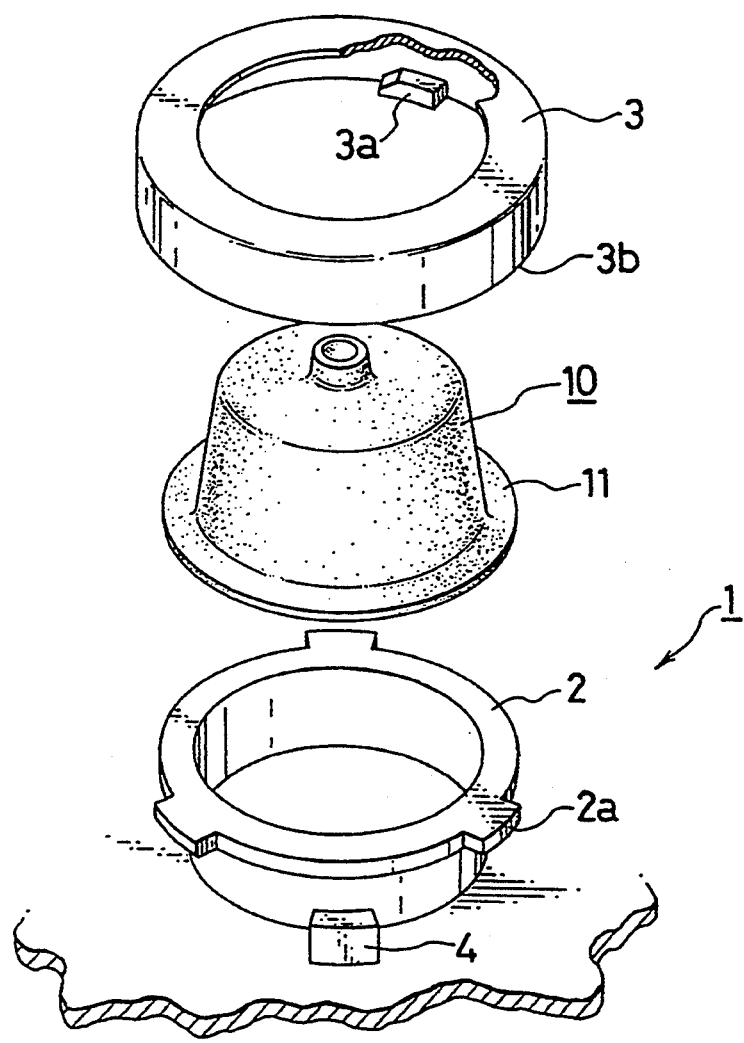
FIG. 1 is an exploded perspective view of an apparatus for holding a rubber cover of a lamp assembly of a vehicle according to an embodiment of the present invention.

As shown in FIG. 1, a lamp assembly of a vehicle comprises a cylindrical holder 2 defining a bulb exchange opening. The holder 2 may be made of a synthetic resin of a slight elasticity. The holder 2 has outer engagement claws 2a protruding radially from a rear flange of the holder 2 at plural (e.g. three) circumferential positions. The lamp assembly 1 further comprises a cylindrical cap 3 having hooks 3a engageable with the outer engagement claws 2a. The cap 3 may be made of a synthetic resin of a slight elasticity. A rubber or elastic cover 10 is mounted on the holder 2 with a flange 11 thereof held between the holder 2 and the cap 3.

The holder 2 has one or more, preferably, three cap abutments 4 formed at its circumferential positions. Each of the cap abutments 4 is located between two adjacent outer engagement claws 2a at such a radial position that the cap abutments 4 engage the bottom edge surface 3b of the cap 3 when the cap 3 is mounted on the holder 2.

Next, a detailed explanation will be given regarding the positional relationship between the cap abutments 4 and the cap 3. The height of the cap abutments 4 is so designed that the bottom edge surface 3b of the cap 3 interferes for elastic deformation with the cap abutments 4 in service of the lamp assembly 1. The amount of the interference or deformation is referred to as a distance in the direction of engagement (direction of thickness of the outer engagement claws 2a) between an upper surface of each of the cap abutments 4 and a theoretical position of the bottom edge surface 3b of the cap 3 in service of the lamp assembly 1, assuming that the cap abutments 4 do not exist. Hereinafter, such distance is referred to as "amount of interference". The most preferable result is obtained when the amount of interference is 0.2–0.3 mm.

Figure 2:
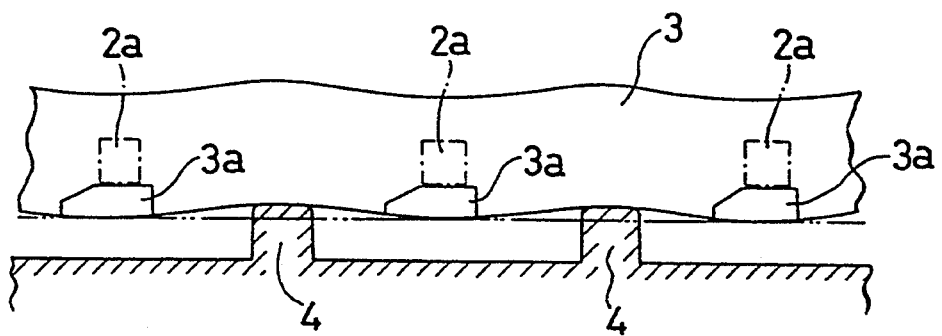
FIG. 2 is an explanatory view illustrating the mechanism of the apparatus of FIG. 1.
Figure 3:
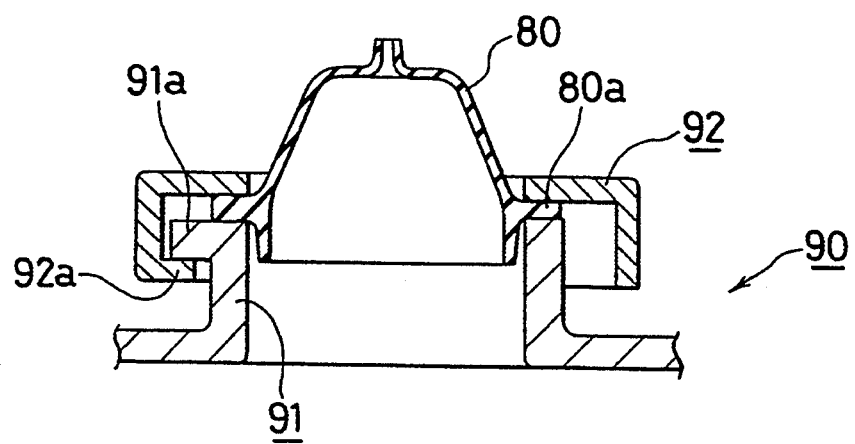
Figure 4:
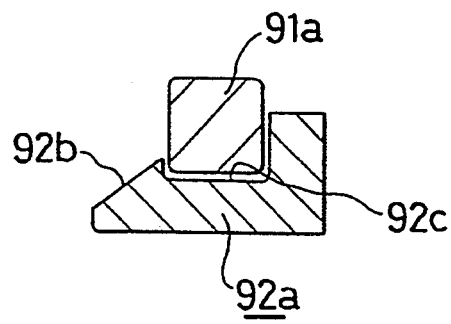
FIG. 4 is an enlarged sectional view of a major part of the apparatus of FIG. 3.

FIG. 2 is an explanatory drawing of the structure of the apparatus showing the mounting of the cap 3 on the holder 2. When the cap 3 is rotated to engage the hooks 3a with the outer engagement claws 2a as shown in FIG. 2, the cap 3 is partially deformed to curve downward at locations corresponding to the positions of the hooks 3a. This produces a resistance in rotating the cap 3, thereby giving a sensible physical response to fingers of the operator.

The cap abutments 4 enable the combination of the holder 2 and cap 3 to produce a sensible physical response which indicates the right engagement of the cap 3 and the holder 2, and establish a secure holding of the cover 10 without use of elasticity of the cover 10. Accordingly, it is possible to give a physical response of the right engagement of the cap 3 and the holder 2 to the operator to securely hold the cover 10 even when the elasticity of the cover 10 decreases due to aging.

In the above embodiment, the cap abutments 4 are arranged for the engagement with the bottom edge surface 36 of the cap. However, the position and height of the cap abutments 4 may be modified in such a way that the cap abutments 4 engage a different portion of the cap 3, e.g., the inner surface of the rear portion of the cap, or extensions from the circumferential surface of the cap.

Although the apparatus of the above embodiment has three cap abutments 4, similar effects can be obtained by providing one or two cap abutments 4.

The present invention is not rigidly restricted to the embodiments described above. It is to be understood that a person skilled in the art can easily change and modify the present invention without departing from the scope of the invention defined in the appended claims.

What is claimed is:

1. An apparatus for holding an elastic cover which is mounted on a lamp assembly for covering a bulb exchange opening of the lamp assembly, comprising:
    a cylindrical holder defining the bulb exchange opening and having a plurality of outer engagement claws projecting outwardly of the cylindrical holder at predetermined intervals in a circumferential direction of the cylindrical holder;
    a cap formed of a slightly elastic material engageable with said holder and retaining the cover together with said holder, said cap having a plurality of hooks for engaging the outer engagement claws of said cylindrical holder when said cap is rotated relative to said cylindrical holder in mounting the cover on said cylindrical holder; and
    at least one cap abutment which is provided on said cylindrical holder at a position which corresponds to a position between an adjacent pair of outer engagement claws so that said cap and said cap abutment of said cylindrical holder interfere with each other when said cap is mounted on said cylindrical holder and rotated relative to said cylindrical holder;
    said at least one cap abutment being arranged such that when said cap is rotated relative to said cylindrical holder, the at least one cap abutment presses a bottom edge surface of said cap in a first direction toward said pair of outer engagement claws while said pair of outer engagement claws resist said pressing by said at least one cap abutment in a second direction that is opposite to said first direction.

2. The apparatus according to claim 1, wherein said at least one cap abutment is provided at a position midway between said adjacent outer engagement claws.

3. The apparatus according to claim 2, wherein said at least one cap abutment is provided at a radial position on said holder such that a bottom end surface of said cap engages said at least one cap abutment.

4. The apparatus according to claim 3, wherein said at least one cap abutment has a height which is determined so that an interference of 0.2–0.3 mm in a direction of engagement is produced between said cap and said at least one cap abutment when said cap is mounted on said holder, said cap bending at said at least one cap abutment due to said interfering when said cap is rotated relative to said holder to engage said hooks with said outer engagement claws.

5. The apparatus according to claim 3, wherein said holder has three of said outer engagement claws, said cap has three of said hooks, and said apparatus has three cap abutments, each cap abutment being arranged between respective adjacent outer engagement claws.

6. The apparatus according to claim 1, wherein:
    the at least one cap abutment and said pair of outer engagement claws, when said cap is rotated relative to said cylindrical holder, deforms the slightly elastic material forming said cap so that said bottom edge surface of said cap has an undulating shape.

* * * * *